(12) United States Patent
Cantonwine

(10) Patent No.: US 9,564,249 B2
(45) Date of Patent: Feb. 7, 2017

(54) SPACERS FOR NUCLEAR FUEL ASSEMBLIES

(71) Applicant: Global Nuclear Fuel—Americas, LLC, Wilmington, NC (US)

(72) Inventor: Paul E. Cantonwine, Wilmington, NC (US)

(73) Assignee: Global Nuclear Fuel—Americas LLC, Wilmington, NC (US)

( * ) Notice: Subject to any disclaimer, the term of this patent is extended or adjusted under 35 U.S.C. 154(b) by 1031 days.

(21) Appl. No.: 13/786,446

(22) Filed: Mar. 5, 2013

(65) Prior Publication Data

US 2014/0254741 A1   Sep. 11, 2014

(51) Int. Cl.
 *G21C 3/34*   (2006.01)
 *G21C 3/348*   (2006.01)

(52) U.S. Cl.
 CPC ............... *G21C 3/348* (2013.01); *Y02E 30/40* (2013.01)

(58) Field of Classification Search
 CPC ........... G21C 3/322; G21C 3/352; G21C 3/30; G21C 3/32; G21C 3/336; G21C 3/34; G21C 3/3408; G21C 3/3416; G21C 3/3487; G21C 3/356; G21C 3/3563; G21C 3/3566; Y02E 30/40; Y02E 30/38
 USPC .......... 376/439, 442, 438, 462; 976/DIG. 60
 See application file for complete search history.

(56) References Cited

U.S. PATENT DOCUMENTS

| | | | | | |
|---|---|---|---|---|---|
| 3,137,638 | A | * | 6/1964 | Kumpf | G21C 3/34 122/135.1 |
| 3,281,327 | A | * | 10/1966 | Webb | G21C 3/322 165/178 |
| 3,398,053 | A | * | 8/1968 | Kropfl | G21C 3/356 376/442 |
| 3,463,703 | A | * | 8/1969 | Crandall | G21C 3/344 376/442 |
| 3,679,546 | A | * | 7/1972 | Muellner | G21C 3/356 376/441 |
| 4,000,595 | A | * | 1/1977 | Fortescue | G21C 11/086 220/62.19 |
| 4,135,972 | A | * | 1/1979 | Anthony | G21C 3/332 376/220 |
| 4,306,937 | A | * | 12/1981 | Hensolt | G21C 3/3408 376/442 |
| 4,702,881 | A | * | 10/1987 | Weiland | G21C 3/3563 376/442 |

(Continued)

*Primary Examiner* — Jack W Keith
*Assistant Examiner* — Sharon M Davis
(74) *Attorney, Agent, or Firm* — Ryan Alley IP

(57) ABSTRACT

Fuel spacers include a perimeter piece and alignment strips extending within the perimeter piece. Alignment strips may have directional variation while still extending in an overall straight line between two contact points on the perimeter piece. Two alignment strips, by their relative positioning and shape, create distinct openings for fuel rods, through which rods may pass and be supported by the spacer on all sides. Alignment strips can be parallel or skew but need not physically intersect or extend at overall right angles to form such surrounding and supporting openings. Shape may be variable, such as a waveform, zig-zag, or saw-tooth. Several layers of alignment strips at any desired angle are useable in spacers, and alignment strips may be varied in length, shape, and number to account for different fuel assembly sizes and features, such as water rods.

10 Claims, 6 Drawing Sheets

(56) References Cited

U.S. PATENT DOCUMENTS

| | | | | |
|---|---|---|---|---|
| 4,726,926 A * | 2/1988 | Patterson | ............... | G21C 3/322 376/261 |
| 4,728,489 A * | 3/1988 | Hatfield | ................. | G21C 3/322 376/439 |
| 4,786,463 A * | 11/1988 | Fernandez | ............. | F28D 7/005 165/162 |
| 4,844,860 A * | 7/1989 | Hatfield | ................. | G21C 3/322 376/439 |
| 5,375,154 A | 12/1994 | Matzner et al. | | |
| 5,546,437 A | 8/1996 | Matzner et al. | | |
| 6,278,759 B1 * | 8/2001 | Yoon | ...................... | G21C 3/352 376/439 |
| 6,650,723 B1 * | 11/2003 | Kang | .................... | G21C 3/352 376/438 |
| 6,912,264 B2 * | 6/2005 | Meier | .................... | G21C 3/322 376/434 |
| 7,418,072 B2 * | 8/2008 | Kemner | ................. | G21C 3/322 376/434 |
| 2004/0196954 A1 * | 10/2004 | Stabel-Weinheimer | . | G21C 3/33 376/438 |
| 2007/0223646 A1 * | 9/2007 | Marzean | .............. | G21C 3/3408 376/438 |
| 2011/0051882 A1 | 3/2011 | Yoon et al. | | |
| 2011/0064184 A1 | 3/2011 | Lee et al. | | |
| 2012/0063562 A1 * | 3/2012 | Shin | ....................... | G21C 3/322 376/442 |
| 2014/0254741 A1 * | 9/2014 | Cantonwine | ........... | G21C 3/348 376/438 |

* cited by examiner

SPACERS FOR NUCLEAR FUEL ASSEMBLIES

BACKGROUND

FIG. 1 is an illustration of a conventional nuclear reactor fuel assembly 10 typically used in commercial nuclear power reactors for electricity generation throughout the world. Several fuel assemblies 10 are placed in a reactor in close proximity to sustain a nuclear chain reaction. A fluid moderator and/or coolant conventionally passes through fuel assembly 10 in a length-wise (axial) direction, enhancing the chain reaction and/or transporting heat away from the assembly 10.

As shown in FIG. 1, fuel assembly 10 includes multiple fuel rods 14 containing fissile material and extending in the axial direction within the assembly 10. Although not shown in FIG. 1, fuel rods 14 are often seated into a lower tie plate 16 and extend upward into an upper tie plate 17 at ends of fuel assembly 10. Fuel rods 14 are bounded by a channel 12 that forms an exterior of the assembly 10, maintaining fluid flow within assembly 10 throughout the axial length of assembly 10. Conventional fuel assembly 10 also includes one or more conventional fuel spacers 18 at various axial positions. Fuel spacer 18 permits fuel rods 14 to pass through grid openings in spacer 18, thereby aligning and spacing fuel rods 14. One or more water rods 19 may also be present to provide a desired level of moderator or coolant through-flow to assembly 12.

FIG. 2 is an illustration of a related art fuel spacer 18 from an axial direction. As shown in FIG. 2, conventional spacer 18 includes several grid openings 41, which may be formed by several ferrules 40. Each ferrule 40 conventionally forms a full circle and is joined with other ferrules 40 to form a grid-like pattern of openings 41 where fuel rods 14 (FIG. 1) should pass and be stabilized through spacer 18. That is, several fuel rods 14 (FIG. 1) may pass through spacer 18 through corresponding ferrules 40 and grid openings 41, when used in an assembly. Ferrules 40 may be joined together by welding among each touching ferrule 40, with perimeter ferrules 40 being welded to perimeter band 49. In this way, each ferrule 40 is rigidly joined to and stabilized with several adjacent ferrules.

Ferrules 40 and thus grid openings 41 may be sized substantially similar to perimeter sizes of fuel rods intended to pass therethrough, permitting a frictional sliding relationship between spacer 18 and a fuel rod. Ferrules 40 in FIG. 2 may further each include two rod-contact stops 42 and one rod-contact spring 43 to control frictional forces when a fuel rod passes therethrough. Grid openings 41 may all be of a substantially similar size and positioned in rectilinear fashion as shown in FIG. 2, or may be positioned and sized differently to accommodate other fuel designs. For example, grid openings 41 for water rods 16 may be larger than grid openings 41 for smaller fuel rods 14. Alternatively, all grid openings 41 may be a same size. Perimeter band 49 may enclose spacer 18 and contact channel 12 (FIG. 1).

SUMMARY

Example embodiments include nuclear fuel spacers that sit along axial positions of a fuel assembly and contact/align fuel rods that pass therethrough. Example embodiment spacers include a perimeter piece of a variety of shapes and formed of a number of different pieces, such as a belly band or an annular fitting, with alignment strips inside of the perimeter piece. Two alignment strips alone can define one or more holes or "quasi-ferrules" that will at least partially surround and allow axial passage of a fuel rod through the spacer. Example embodiments can use a variety of structures for alignment strips, including simple waveform internal spans that can be directly welded to the perimeter piece, more complex stamped or machined pieces with flow tabs, swirl vanes, trippers, and/or any other feature, or composite meshes, for example. Alignment strips can be parallel, such as in evenly-spaced diagonal rows, or skew, but alignment strips do not have to touch or be at the same elevation to form openings for fuel rods. Example embodiments using simple alignment strips, such as continuous internal spans that are formed of a single, non-interrupted material, may be welded only to the perimeter piece, such that manufacture is greatly simplified and welds and other often failing connections are reduced in some example embodiments. Example embodiment spacers are useable with a variety of fuel assembly configurations, including parallelepiped assemblies with fuel rods arranged in grids of rows and columns.

Example embodiments can be formed of any material that is resilient in nuclear reactor conditions, including stainless steels, nickel alloys, aluminum alloys, and/or zirconium alloys and several other materials. Components of example embodiment spacers may be formed with any desired stiffness such that example embodiments may not elastically deform to typical forces experienced by fuel rods or without rigidity such that alignment strips elastically bend or flex under such forces. A number of other features are also compatible with example embodiments, including rod contacts (stops and/or springs) that contact and brace fuel rods in each direction in openings, flow tabs that mix or direct fluid coolant/moderator in a desired manner through openings and against fuel rods, trippers, filters, etc.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
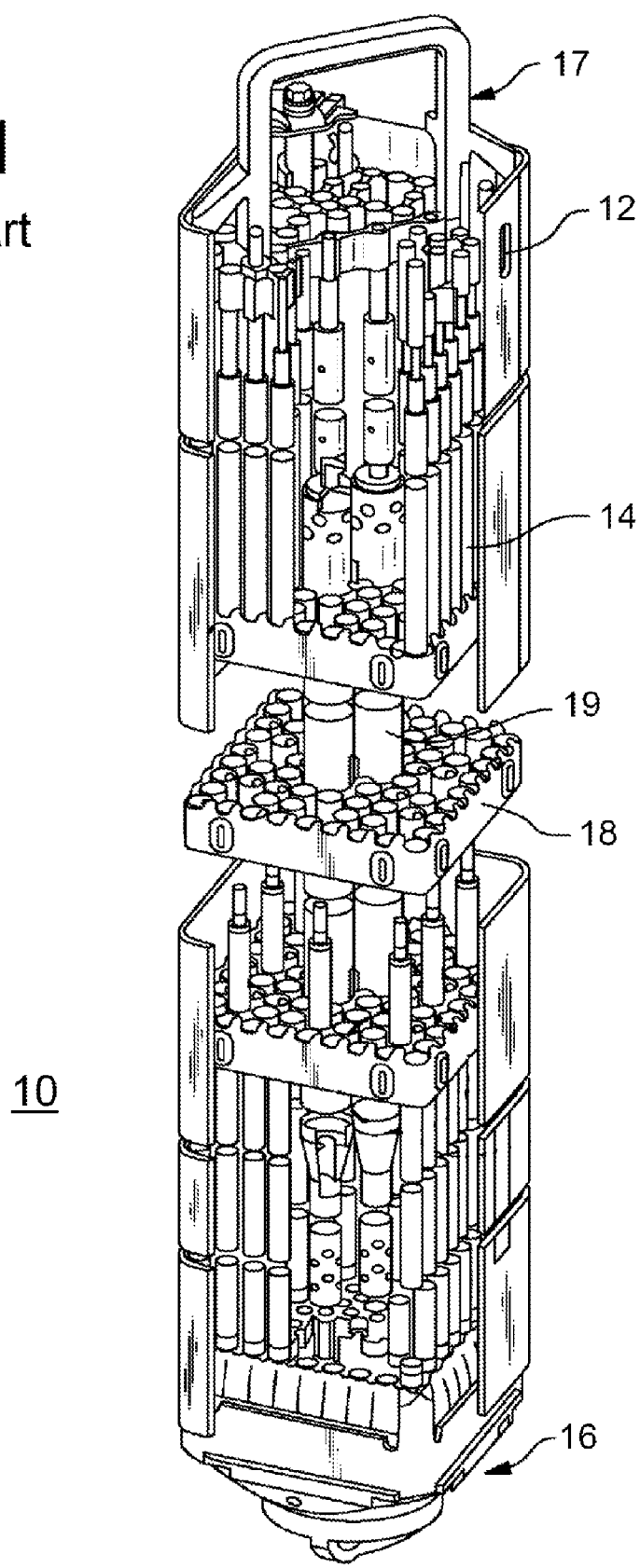
FIG. 1 is an illustration of a section of a conventional nuclear fuel assembly.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

Applicants have recognized that fuel assemblies are subjected to a variety of shocks and strains over their lifetime, including shipping, installation, handling, seismic events, and power generation, that cover a wide array of force profiles on the assembly. As such, it is desirable to minimize vibration and maintain fuel rods in particular positions in a fuel assembly for fluid flow, neutronics, and handling purposes, while minimizing risk of damage from structures that provide desired positioning. Such damage may be caused by failures at particularly weak and/or intersection points, such as welds or other connections within a spacer. Further, Applicants have recognized a need for fuel rod spacing and securing with minimal flow blockage and simplified manufacturing of components to so space and secure each and every fuel rod in an assembly, of which there may be dozens.

These and other problems recognized by Applicants are addressed below with unique solutions enabled by example embodiments.

The present invention is fuel spacers, fuel assemblies having spacers, and methods of forming and using the same. Spacers of the present invention include plural alignment strips within a perimeter piece that are shaped, aligned, and extend in such a manner so as to form distinct axial openings for fuel rods without a need to directly or proximally contact each other, although direct contact between alignment strips may be used to provide other functions. Example embodiments discussed below illustrate just a few of the variety of different configurations and structures that can be used in connection with the present invention.

Figure 2:
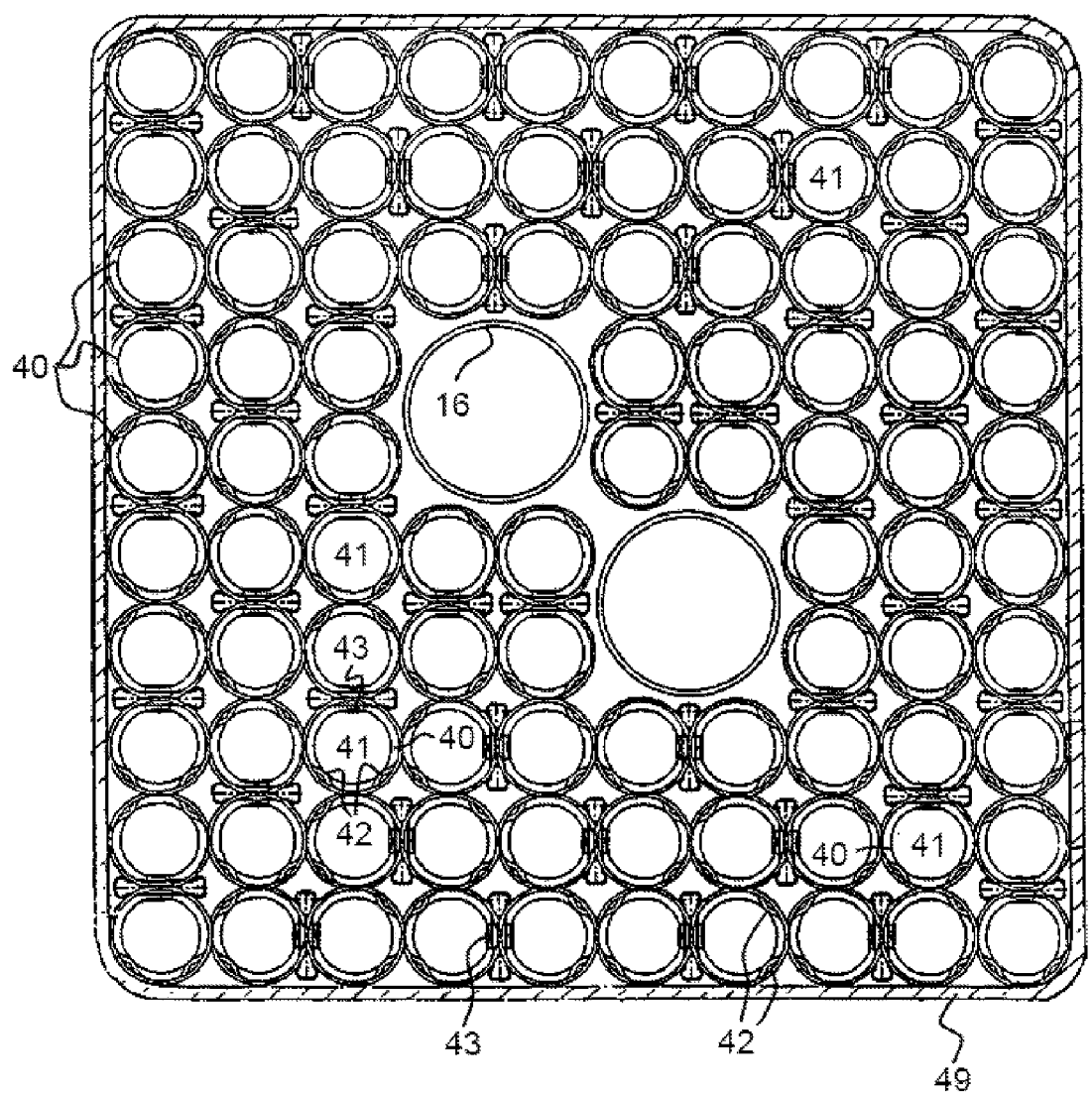
FIG. 2 is an illustration of a related art fuel spacer from an axial direction.
Figure 3:
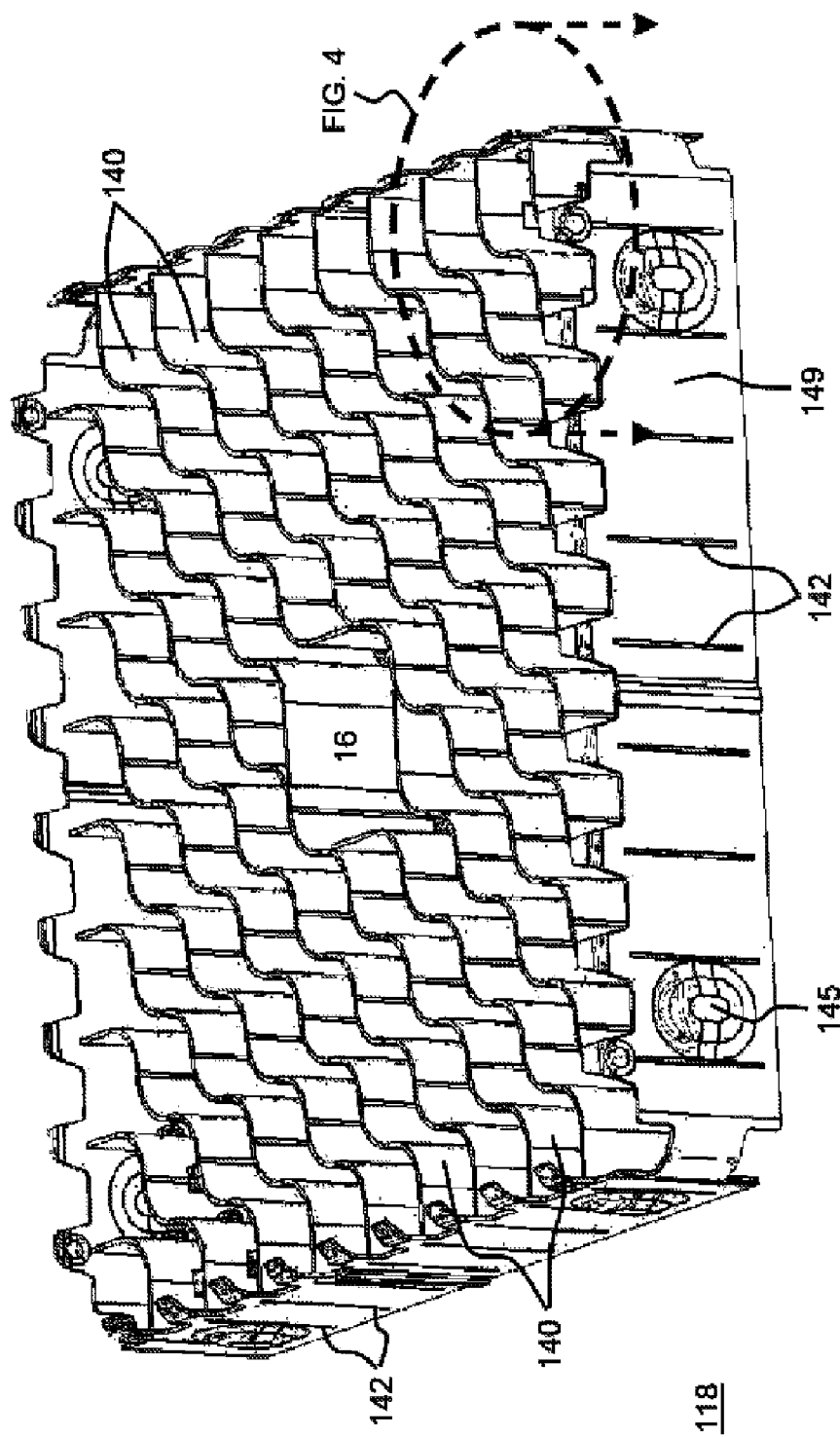
FIG. 3 is an illustration of an example embodiment fuel spacer.

FIG. 3 is an illustration of an example embodiment fuel spacer 118. As shown in FIG. 3, example embodiment fuel spacer 118 may include several features of, and be useable with or in place of, related fuel spacers, in nuclear fuel assemblies, such as those shown in FIGS. 1 and 2. For alignment strips, example embodiment fuel spacer 118 includes several internal spans 140 positioned within a perimeter piece, here, outer perimeter band 149. Internal spans 140 are positioned and configured to create openings for and support fuel rods that may pass through example embodiment spacer 118, providing any desired vibration and/or movement dampening, ensuring proper rod placement, and/or maintaining fuel rods in such positions.

For example, internal spans 140 may be waveform with multiple peaks and valleys/crests and troughs having curvature approximating outer perimeters of fuel rods. Such waveform internal spans 140 may be aligned in diagonal rows at a consistent angle and pitch to accommodate a grid of fuel rods, so as to mimic portions of diagonally-proceeding sinusoids or curves formed by conventional ferrule-type spacers when viewed along certain sight lines. That is, waveform internal spans 140 may each generally extend about a straight line while evenly deviating from the line to create desired openings with other internal spans 140. Of course, other configurations, arrangements, and numbers of internal spans 140 may be used with other fuel designs; for example, internal spans 140 may be relatively straight or zig-zag, or placed at other non-uniform and non-orthogonal angles aside from the roughly consistent 45-degree diagonal to accommodate fuel rods laid out in other arrangements.

Internal spans 140 may be uniform or non-uniform; they may extend only partially throughout example embodiment spacer 118 or may be varied in particular positions, allowing for conventional ferrules or grid openings to be used in other portions of spacer 118 or for other components to be present. For example, as shown in FIG. 3, a central void may be formed for a water rod 16 by varying two central-most internal spans 140 with larger central crests and troughs sized to permit a water rod to pass therethrough.

Internal spans 140 connect to perimeter band 149 at junction points 142. Each internal span may use two junction points 142, one at each end, in order to secure to perimeter band 149. Junction points 142 may use any form of material joining, including welding, fastening, tang-and-auger type receiving, pass-through and crimping, etc. Internal spans 140 may be continuous pieces or formed from several joined segments. If internal pans 140 are continuous and each use only one or two junction points 142 with welding, example embodiment fuel spacer 118 may have considerably simplified manufacture and construction, requiring only a number of welds equal to or less than twice the number of internal spans 140 used, which may be limited to less than a number of rows or columns of fuel rods to be used with example embodiments.

Internal spans 140 may be fabricated of any materials that substantially maintain their mechanical properties in an operating nuclear reactor environment. For example, a metallic material may be used, such as a zirconium, aluminum, nickel and/or iron alloy like Zircaloy, X750 or stainless steel. Internal spans 140 may be formed of a thickness or other rigidity-determinative feature to achieve a desired stiffness and/or flexibility based on a selected fabrication material. For example, internal spans 140 may be formed relatively thin so as to be somewhat elastic and minimize cross-sectional flow blockage. In such a case, the individual fuel rods loaded through an example embodiment spacer and contacting internal spans 140 may impart actual stiffness to an example embodiment spacer 118. Load stiffeners, such as rigid and removable braces extending across a spacer or fuel assembly, may be used in this example to provide stiffness and shock support during shipping. Or, for example, internal spans 140 may be formed of a material and thickness to remain relatively rigid and provide relatively static positioning of fuel rods passing therethrough, without the need for additional load stiffeners during shipping.

Figure 4:
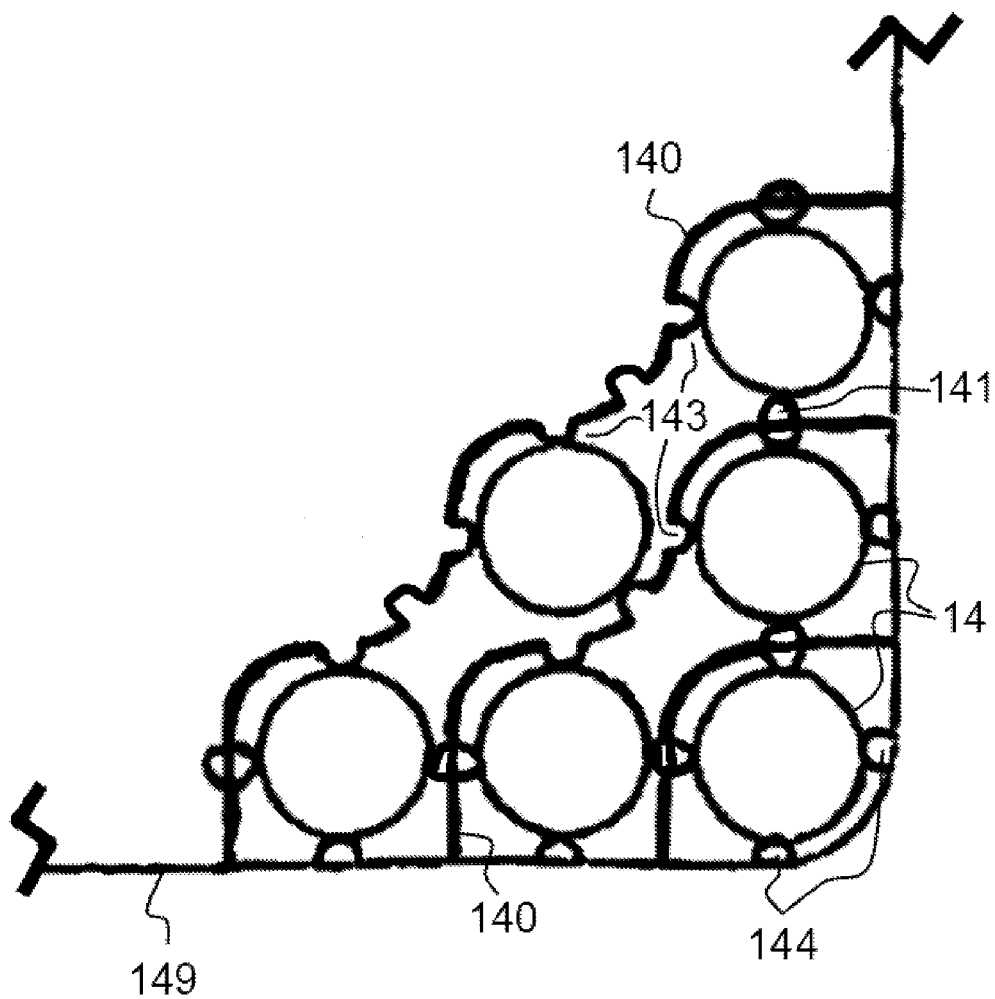
FIG. 4 is an illustration of a detailed section of the example embodiment fuel spacer of FIG. 3 in use with fuel rods.

Other known features, including swirl vanes, rod contacts, trippers, etc. are useable in example embodiment fuel spacer 118. FIG. 4 is an illustration of a section of example embodiment fuel spacer 118 from FIG. 3 in use with different types of rod contacts useable in example embodiment fuel spacers. For example, FIG. 4 shows indents 143 in internal spans 140 being used as rod contacts. Indents 143 may be materially continuous with the reminder of internal span 140 and sized and shaped to make a small and direct contact with fuel rods 14. As shown in FIG. 4, if adjacent internal spans 140 use opposing and adequately spaced indents 143, fuel rods 14 may be contacted at three or more positions spaced about their perimeter by indents 143 from different internal spans 140. Also as shown in FIG. 4, conventional or other types of non-indent rod contacts 141 are useable at perimeter positions where three surrounding indents 143 are not available to provide a consistent force profile in each dimension, or any other desired position.

One or more perimeter springs 144 may be used in example embodiment fuel spacers to provide a desired level of elastic movement of fuel rods 14 within perimeter band 149. For example, if contacts between internal span 140 and fuel rods 14 are relatively rigid, such as with indents 143, then fully populating an example embodiment spacer with fuel rods may result in a generally static spacer with little relative movement between individual fuel rods 14 and between rods 14 and internal spans 140. Perimeter springs 144 about perimeter band 149 and/or substituted for indents 142 at desired positions in such an example may add a desired degree of elasticity and control friction forces when inserting rods during fabrication and dampened relative movement.

Figure 5:
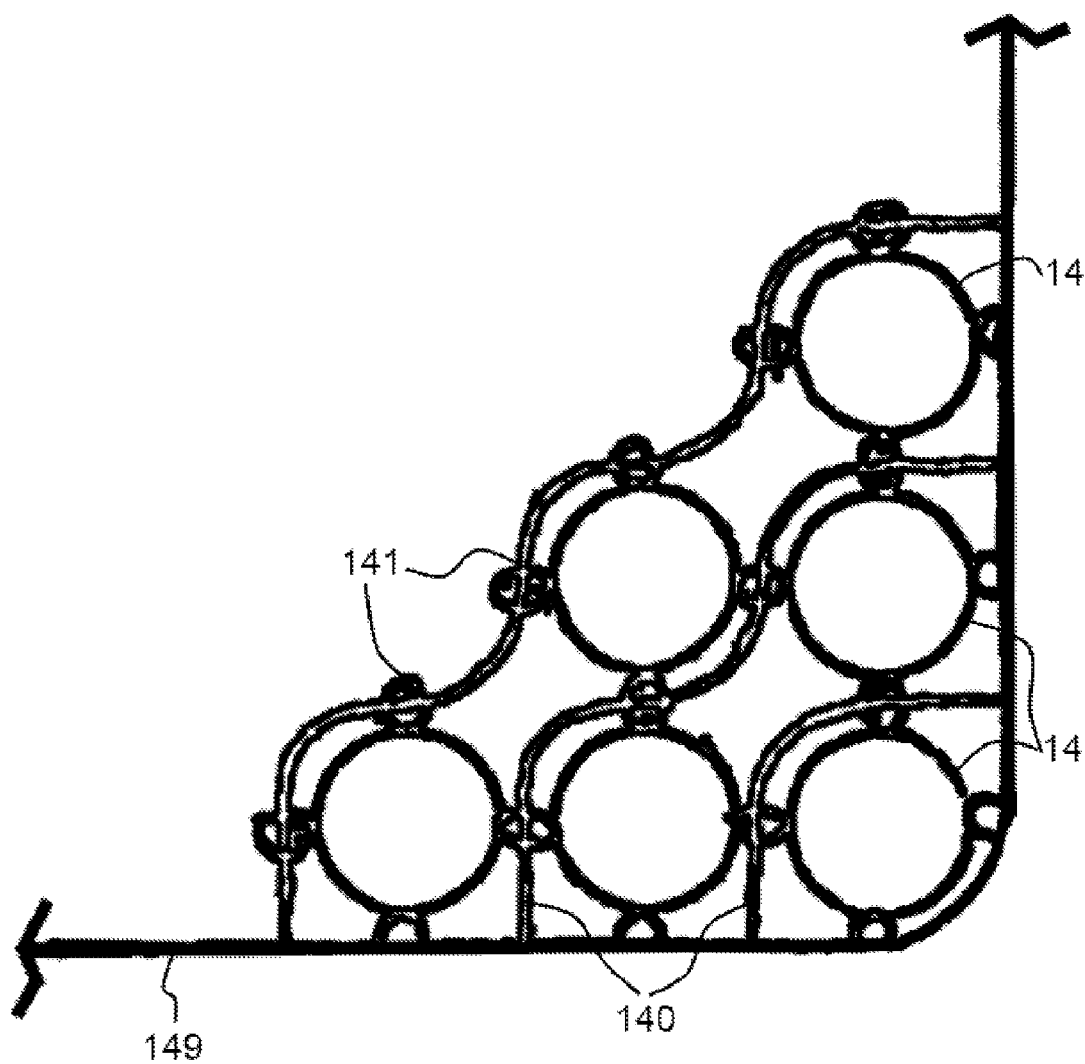
FIG. 5 is an illustration of another detailed section of the example embodiment fuel spacer of FIG. 3 in use with fuel rods.

As shown in FIG. 5, another configuration may include other rod contacts 141 positioned and sized to contact each fuel rod 14 that passes between adjacent internal spans 140. If internal spans are waveform with appropriate sizing and pitch, four rod contacts 141 may contact fuel rods 14 approximately orthogonally at every 90-degrees or so about each fuel rod 14. Rod contacts 141 may provide relatively rigid and/or elastic contact to fuel rods 14, depending on a desired stabilization and positioning characteristic. For example, deflection-limited rod contacts from co-owned application "SPACERS WITH DEFLECTION-LIMITED ROD CONTACTS FOR NUCLEAR FUEL ASSEMBLIES AND METHODS OF MAKING THE SAME" Ser. No. 13/603,184 filed Sep. 4, 2012, incorporated herein in its entirety, are useable as contacts 141, as are a variety of other known contact designs. Still alternatively, continuous and substantial direct contact between internal spans 140 and fuel rods 14, instead of smaller, discreet rod contacts 141, is permissible in example embodiments.

As seen in FIGS. 4 and 5, example embodiment fuel spacer 118 may use internal spans 140 with simplified construction and manufacture and less cross-sectional area, and thus flow blockage, to provide nearly equivalent surrounding support and positioning to fuel rods 14 passing therethrough. Use of internal spans 140 alone in an example embodiment spacer may reduce cross-sectional blockage by up to half, compared to conventional ferrule-type spacers, by surrounding fuel rods 14 about less of their outer perimeter while still supporting fuel rods from each direction. Similarly, continuous internal spans 140 joined to perimeter band 149 at welded connection points 142 may decrease a number of welds required by an example embodiment spacer from approximately 500 to about 50. Example embodiments with various types of alignment strips are also useable with a greatly reduced number of springs, if rod-contacting springs are limited to use on a perimeter piece and only other contacts are positioned on alignment strips.

Internal spans 140 may further be compatible with other types of rod contacts from those shown in FIGS. 4, 5, or the incorporated documents, as well as flow mixers, swirl vanes, flow wings, filters, trippers or other mechanisms to provide desired fluid dynamics to fuel rods 14 passing therethrough and spaced by the same. Example embodiment fuel spacers may further include conventional features for compatibility with existing fuel designs as well as additional features to enhance fuel performance, such as bathtubs 145 in perimeter band 149, which may be the same bathtubs as in co-owned application "SPACERS WITH DEFLECTION-LIMITED PERIPHERAL SPRINGS FOR NUCLEAR FUEL ASSEMBLIES AND METHODS OF MAKING THE SAME" Ser. No. 13/429,217 filed Mar. 23, 2012, incorporated herein in its entirety.

Example embodiment fuel spacers may include internal spans at different elevations, as opposed to internal spans 114 of the example embodiment spacer 118 of FIG. 3 at a substantially same axial position. Example embodiment fuel spacers may also include intersecting and/or non-parallel internal spans, as opposed to the substantially diagonal and parallel internal spans 114 of the example embodiment spacer 118 of FIG. 3.

Figure 6:
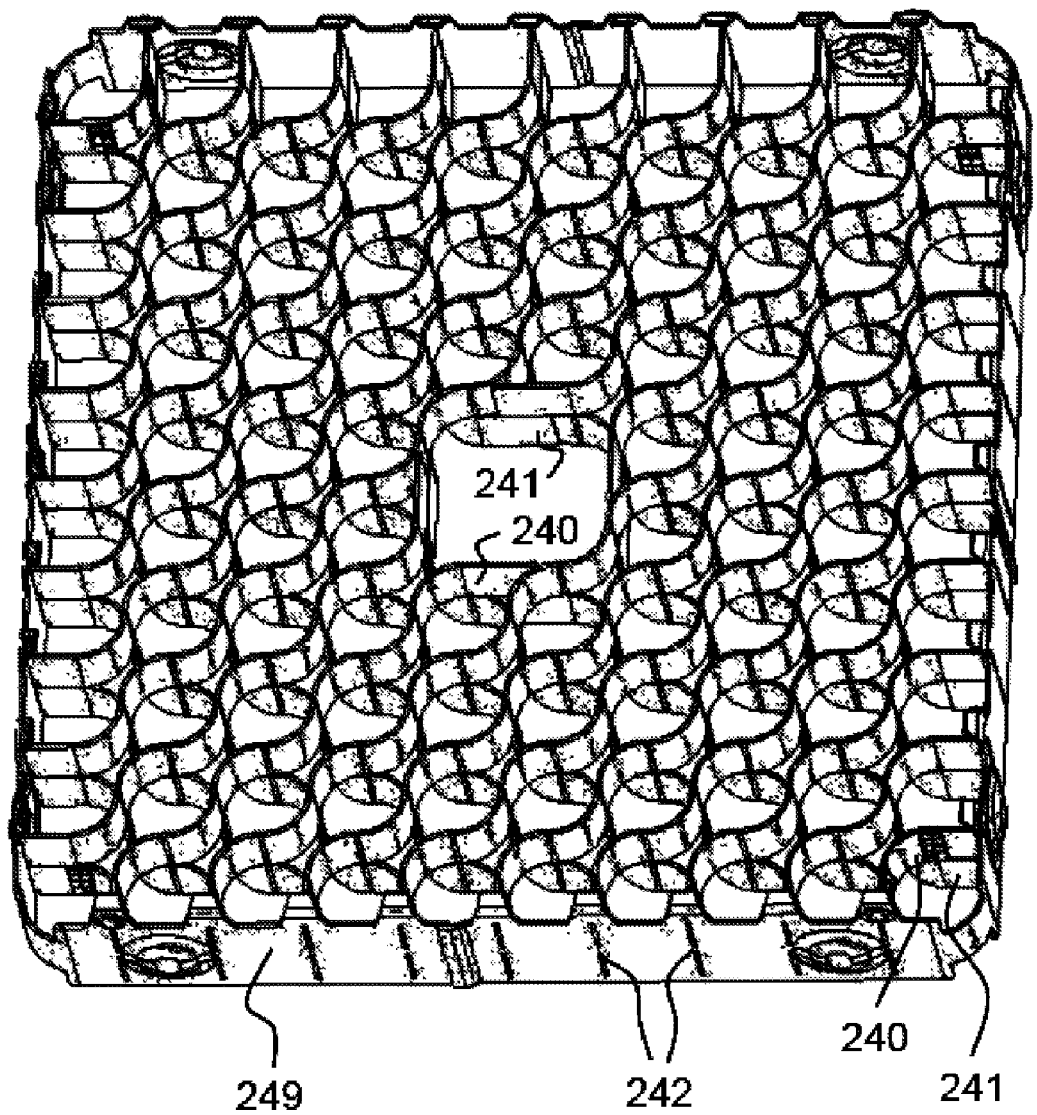
FIG. 6 is an illustration of another example embodiment fuel spacer.

FIG. 6 is an illustration of another example embodiment spacer 218, which may have several similar features to other example embodiments and be useable with the same, including an outer perimeter band 249. As shown in FIG. 6, a first set of internal spans 240 may be waveform and parallel in a first direction and at a first elevation. A second set of internal spans 241 may be waveform and parallel in a second direction and at a second elevation. The two sets of internal spans 240 and 241 may be overlaid and positioned with appropriate pitch as shown in FIG. 6 so as to form multiple grid "openings" where individual fuel rods can pass. Two internal spans 240 and 241 that intersect/overlap in the axial direction may be in contact, joined, or completely separate. In the example of FIG. 6, two internal spans 241 and 240 may use a same junction point 242 to join to spacer band 249, so as to minimize any joining of parts and/or welds.

Through an example embodiment fuel spacer 218 shown in FIG. 6, internal spans 240 and 241 may together nearly or fully surround each fuel rod passing through the spacer, closely matching the seating and surrounding provided by a conventional ferrule spacer, yet without the need to form and join several individual ferrules. Example embodiment fuel spacer 218 may also use a variety of other spacer features alone or in combination, including rod contacts, stops, swirl vanes, trippers, flow vanes, filters, etc. to provide a desired mechanical and fluid-dynamic response from example embodiment spacer 218. Similarly, each internal span 240 and 241 may be chosen of a desired reactor-resilient material and formed with a desired thickness or stiffness to provide a desired mechanical and fluid-dynamic response from example embodiment spacer 218.

Example embodiments and methods thus being described, it will be appreciated by one skilled in the art that example embodiments may be varied and substituted through routine experimentation while still falling within the scope of the following claims. For example, although some example embodiments are described with rod contacts extending in opposite directions from internal spans, it is understood that example embodiment spacers may include any combination and positioning of rod contacts and internal spans. Further, it is understood that example embodiments and methods can be used in connection with any type of fuel and reactor where axial spacers are used to align fuel rods. Such variations are not to be regarded as departure from the scope of the following claims.

What is claimed is:

1. A fuel spacer for use in a nuclear fuel assembly, the spacer comprising:
   a perimeter piece;
   a first alignment strip connected to two points on the perimeter piece; and
   a second alignment strip connected to two points on the perimeter piece, wherein the first and the second alignment strips are substantially parallel to each other and together and alone define a plurality of openings between the first and the second alignment strips through each of which a fuel rod is able to pass in an axial direction,
   wherein the first and the second alignment strips are internal spans that are waveform, and wherein the internal spans extend at an approximately 45-degree angle from the perimeter piece.

2. The fuel spacer of claim 1, wherein the first alignment strip and the second alignment strip do not directly touch.

3. The fuel spacer of claim 1, wherein each opening of the plurality of openings permits only a single fuel rod to pass through the opening in the axial direction.

4. The fuel spacer of claim 1, wherein the perimeter piece is quadrilateral and wherein the two points of the first alignment strip are on a first side and a third side of the quadrilateral and the two points of the second alignment strip are on a second side and a fourth side of the quadrilateral.

5. The fuel spacer of claim 1, wherein the internal spans are continuous without internal material interruption.

6. The fuel spacer of claim 5, wherein the perimeter piece is a perimeter band in a parallelogram shape, and wherein the internal spans directly contact only the perimeter band each at the two points via welding.

7. The fuel spacer of claim 1, wherein the first alignment strip and the second alignment strip are fabricated of a stainless steel, aluminum, nickel, and/or zirconium alloy.

8. The fuel spacer of claim 7, wherein the first alignment strip and the second alignment strip are not rigid.

9. The fuel spacer of claim 1, further comprising:
   a third alignment strip connected to two points on the perimeter piece; and
   a fourth alignment strip connected to two points on the perimeter piece, wherein the third and the fourth alignment strips are substantially parallel and orthogonal to the first and the second alignment strips, and wherein the third and the fourth alignment strips are at a distinct axial position from the first and the second alignment strips.

10. The fuel spacer of claim 1, further comprising:
    a plurality of rod contacts extending into the openings defined by the first and second alignment strips,
    wherein three of the plurality of rod contacts extend into one of the openings, and wherein two of the three rod contacts are formed from the first alignment strip without material interruption between the two rod contacts and the first alignment strip, and wherein one of the three rod contacts is formed from the second alignment strip without material interruption between the one rod contact and the second alignment strip.

\* \* \* \* \*